May 17, 1960     I. JEPSON     2,937,261

ELECTRIC COOKING VESSEL AND METHOD OF MAKING SAME

Filed Nov. 8, 1955

INVENTOR.
Ivar Jepson
BY
George R. Clark
Atty.

United States Patent Office 2,937,261
Patented May 17, 1960

2,937,261

ELECTRIC COOKING VESSEL AND METHOD OF MAKING SAME

Ivar Jepson, Oak Park, Ill., assignor to Sunbeam Corporation, Chicago, Ill., a corporation of Illinois Application November 8, 1955, Serial No. 545,727

10 Claims. (Cl. 219—44)

The present invention relates to an electric cooking vessel and a method of making it, wherein the electrical element is integrally united to the vessel. In recent years the use of culinary utensils having the heating means made integral with the bottom of the utensil has become very wide spread. Many electrical appliances such as deep fryers, roasters, frypans and the like employ such self-contained or integral heating elements.

There are a number of advantages associated with cooking with utensils which have the electrical element secured to the bottom of the vessel. A great increase in efficiency is realized through having the heating element intimately associated with the vessel. The conventional surface units found on electric stoves, hot plates, etc., afford very inefficient transfer of heat between the heating element and the cooking vessels placed thereon. Heat transfer from the cooking unit to the vessel is accomplished primarily through convection and radiation since the contact between the vessel and the unit is not intimate enough to permit good heat conduction therebetween. The efficient heat transfer which is found where the integral heating unit is employed results not only in a saving in electricity but also in a reduction of the often unpleasant and annoying heat which is radiated from the conventional stove or heating unit.

In addition, today's trend toward less formal eating habits makes it often desirable to have a portable cooking utensil which may be employed away from the normal cooking area of the kitchen. Because of the above-mentioned advantages, a steadily increasing consumer demand has grown up for portable electric cooking units. One of the chief problems encountered in producing such units is that of making a metallic vessel of good heat conducting properties to which a suitable sheathed heating element may be easily assembled. The most widely used material for cooking vessels is aluminum because of its comparative low cost and its high coefficient of thermal conductivity. When an aluminum vessel is employed, the material of which the sheathed heating element is to be made must be selected of some metal which may be readily united or bonded to the aluminum vessel. Conventionally, the sheaths for enclosed heating elements are fabricated of steel or copper. The heating element itself which is made of Nichrome or some other resistance wire is formed into an elongated helical coil which is inserted into the sheath member. A dielectric material which has good heat conducting properties and good electrical insulating properties such as magnesium oxide is then employed to space the resistance wire from the sheath. The magnesium oxide in granular or powdered form is deposited within the sheath and compacted by vibrating the assembly and tamping the contents thereof. To insure good heat conduction through the compacted magnesium oxide, it has been found to be necessary to further compress the material. This additional compressing is usually accomplished by a rolling operation which reduces the diameter of the sheath and thereby compresses the contents. The assembly comprising the resistance coil, the compacted magnesium oxide, and enclosing metal sheath creates a highly efficient heating unit which may be closely associated with the device to be heated.

The problem of uniting this sheathed element to a vessel has been approached from many different angles. It should be obvious to those skilled in the art that the bonding of a conventional copper or steel sheath to an aluminum vessel would present many difficulties. The most common method of constructing an aluminum vessel with a self-contained heating element heretofore has been to cast the vessel with the sheathed element being molded within the aluminum casting. Although the results of this method are good, it is quite expensive.

The other conventional or well-known methods of securing sheathed heating elements consist of soldering or brazing. Neither of these methods would be satisfactory in the case of an aluminum vessel. Any brazing or high-temperature solder would require temperatures of such a degree as to anneal and thereby soften the aluminum vessel to such an extent that it would not be useful as a cooking utensil. In addition, if the sheath were made of aluminum, the high temperatures would soften the sheath to such an extent that the magnesium oxide would no longer be under compression. The flux normally used in soldering or brazing would also create a problem since it would tend to contaminate the dielectric material employed in the heating element. Such contamination would cause breakdown of the insulating material.

It is, therefore, an object of this invention to provide a simple inexpensive means of uniting a sheathed heating element to an aluminum cooking vessel.

It is a further object of this invention to provide a simple, inexpensive method of producing an aluminum cooking vessel with an aluminum sheathed heating element secured integrally thereto.

It is an additional object of this invention to provide a method whereby an aluminum sheathed heating element may be welded to an aluminum vessel.

It is an additional object of this invention to provide an inexpensive cooking utensil having a sheathed heating element welded to the bottom thereof.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which.

Figure 1:
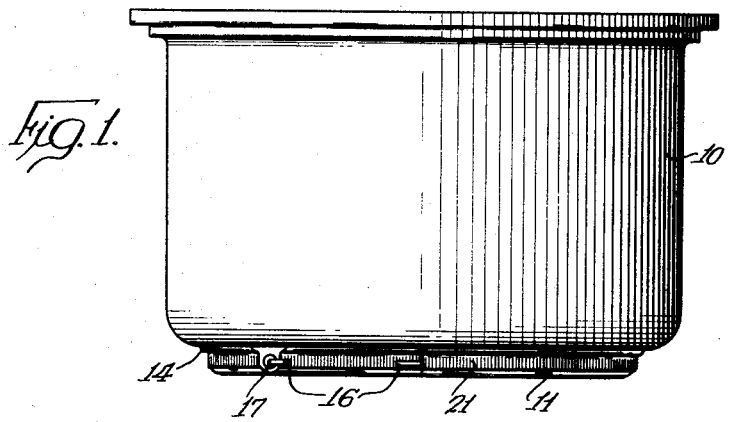
Fig. 1 is an elevational view of a cooking vessel made in accordance with the present invention.
Figure 2:
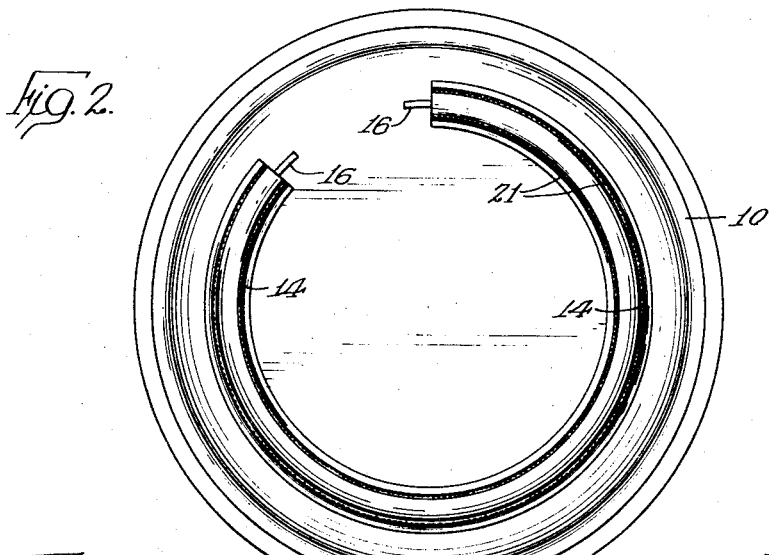
Fig. 2 is a bottom plan view of Fig. 1.

The cooking vessel of the illustrative embodiment of the invention, which is generally indicated 10, may take the form of a deep wide-mouthed vessel such as is used in deep fat fryers of the type disclosed and claimed in my co-pending U.S. patent application 316,209, filed October 22, 1952. As shown in Figs. 1 and 2, a sheathed heating element 11 of generally annular shape is secured to the bottom of the vessel 10. The method of making this sheathed element and securing it to the bottom of the vessel constitutes a part of the present invention.

Figures 3, 4:
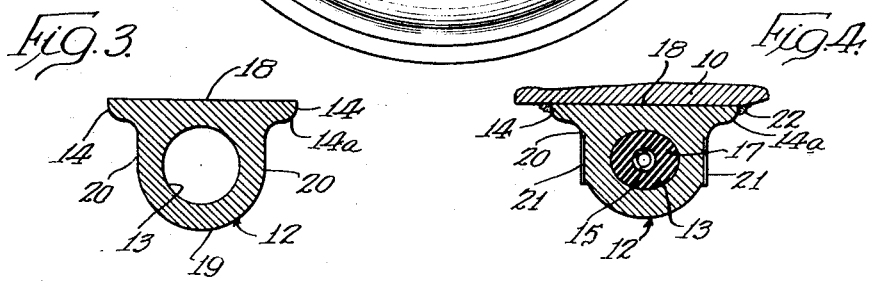
Fig. 3 is a sectional view of the extruded aluminum sheath prior to assembly.
Fig. 4 is a sectional view of the sheathed heating element as assembled to the cooking vessel.

A sheath 12 which encloses the heating element comprises a straight piece of extruded aluminum having a circular center bore 13 and a pair of tangentially extending flanges 14. The flanges 14 are designed to permit welding of the sheathed heating element 11 to the vessel 10 as will be explained in greater detail below. The sectional view of the extruded aluminum sheath 12 given in Fig. 3 is an enlarged view, the bore 13 actually being of such dimensions as to provide sufficient clearance between the heating element and the sheath so that the dielectric material will not break down.

A coil 15 of resistance wire is wound of such a length and coil distribution so as to provide the desired heat distribution through the sheath 12 to the cooking vessel 10. The ends of the coil 15 are fastened as by welding to the terminal pins 16 to which the external electrical connections to the heating element 11 are made. A disc-like closure member is integrally associated with one of the terminal pins 16 to close one end of bore 13 when the coil and sheath are assembled. The coil 15 when assembled to sheath 12 is positioned in the center of the bore 13. A suitable dielectric material such as magnesium oxide in powdered or granulated form is then introduced into the bore 13 to completely fill the voids between the resistance wire 15 and the sheath 12. The dielectric material 17 is selected as having good electrical insulating properties while at the same time having good heat conducting properties.

To facilitate heat conduction through the granular magnesium oxide 17, it is necessary to compact the material to a nearly solid mass. The life of a sheathed heating element is determined to a large extent by the uniformity and degree of compaction of the magnesium oxide. If the distribution of the magnesium oxide is not uniform around the coil, hot spots will develop on the coil adjacent places where there is an absence of such dielectric material. The well compacted magnesium oxide being a good conductor of heat allows heat to pass rapidly from the coil to the sheath and then to the vessel. Any absence of magnesium oxide prevents this dissipation of heat from the coil and causes the above-mentioned hot spots. These hot spots result in portions of the coil operating at temperatures above those for which they were designed, which, in turn, causes the coil or dielectric to fail at that particular point. The preliminary compacting of the dielectric 17 is accomplished by vibrating the sheath 12 and tamping the material as it is introduced into the sheath.

Conventionally a rolling operation is employed to reduce the sheath bore dimension 13 so as to further compact the dielectric material. Because of the plastic nature of aluminum, it would not be as well adapted to such a rolling process. A swaging operation is therefore employed to reduce the bore 13 and complete the compacting of the dielectric 17.

The swaging operation is faster and more efficient than the conventionally employed rolling process and leaves the resistance distribution of the element unaffected since it modifies only the cross section and not the length of the sheathed element. On the other hand, the rolling operation has the disadvantage that it increases the length of the sheathed element and thereby changes the resistance distribution of the element. The swaging die is adapted to apply a compressive force against the horizontal body portion 18 and the semi-cylindrical portion 19 of the sheathed element 12. The side walls 20 and flanges 14 of the sheath are restrained from plastic deformation by the cooperating die.

Considering the sectional view of Fig. 4, it may be seen that the compressive force applied to the surfaces 18 and 19 deforms the bore 13 from the circular section to an elliptical section. The major diameter of this ellipse corresponds approximately to the diameter of bore 13 while the minor diameter of the ellipse is approximately 1/16 of an inch less than the major diameter. To effect such a deformation of the sheath 12 and the resulting compression of the dielectric 17, it is necessary to apply a force of about 40 tons per square inch. It should be understood that this compressive force could be varied considerably while still effecting a satisfactory compression of the dielectric 17.

After the sheathed element has been swaged, it is formed into the annular shape shown in Fig. 2. This circular forming is accomplished by driving the straight sheathed element with a pair of spaced knurled rollers which force the sheath against a curved die to bend it to a selected radius. The V-shaped knurling marks 21 are formed in the sides 20 of the sheath by the above-described knurled rollers. It should be realized that a number of alternative methods of forming could be employed in lieu of the knurled rollers and die employed in the illustrative method.

After the sheath assembly 11 has been formed to its annular shape, it is subjected to an additional swaging operation which tends to further compact the dielectric material 17. It should be understood that upon forming a bend in a sheathed heating element that the outer wall of the sheath at the point of the bend will become somewhat elongated. This elongation reduces the degree of compaction of the dielectric material in that area of the sheath. In order to recompact the material in this portion, it is necessary to swage the element again. The second swaging operation serves an additional function of coining the heating element so that the annular portion 18 is again formed to a plane surface. The portion 18 becomes distorted from a plane surface by the forming operation which gives the sheath assembly 11 its annular shape.

After the sheath assembly 11 has been subjected to the second swaging operation, it is ground to provide a suitable surface to abut the vessel. The grinding is thus designed to eliminate any discontinuities in the surface 18 so that it will lie in a single plane and intimately engage the bottom surface of the vessel 10. The grinding operation may be performed by any suitable wheel or belt type grinder.

After the grinding operation, the annular sheath assembly 11 is ready to be secured to the bottom of vessel 10. This latter step is accomplished by welding the flanges 14 of the sheath to the bottom of the aluminum vessel by a shielded arc welding process such as is described in U.S. Letters Patent No. 2,504,868.

Because of the nature of the welding process, it has been found necessary to provide the flanges 14, which are formed with rounded portions 14a. The shielded arc welding process referred to above requires the elimination of any sharp angles adjacent the line along which welding is being performed. If the flanges 14 were omitted, successful welding of the sheath to the vessel would be almost impossible because of the arc blowouts which would result. These arc blowouts are apparently caused when the gases generated by the welding are confined to too small an area and result in extinguishing the arc. By providing the tangentially extending flanges 14 with their rounded corners 14a, it is possible to successfully employ the shielded arc welding process.

The flange 14 serves an additional purpose by spacing the portion to which the welding heat is applied from the main portion of the sheath. If the welding arc were applied closely adjacent the wall of the sheath, it would probably soften the sheath to such an extent that the compressive force on the dielectric 17 would be substantially reduced. A further advantage resulting from the use of the flanges 14 is that less welding heat is required to melt the flange portions which are of much less bulk than the body of the sheath.

The welding arc operating along each of the flanges 14 fuses a portion of the flange 14 to the bottom of the vessel 10. Considering the sectional view of Fig. 4, the flanges and the vessel are fused over approximately 1/16 of an inch inward from the tip of each flange. In addition, a fillet 22 is deposited adjacent the outer end of the flange 14. This fillet effectively increases the area of fused junction between the sheath and the vessel It has been found that the fused area of the flange together with the fillet provide for adequate heat conduction from the sheath to the vessel. In the area of the annular surface 18 between the fused portions of the flanges 14, fairly intimate contact between the sheath and the vessel is obtained as a result of the swaging and grinding steps described above.

By means of the method outlined above therefor, a sheathed heating element may be secured in intimate heat exchange relationship to an aluminum cooking vessel. The method permits the use of an inexpensive welding operation to actually unite the vessel and the sheath of the heating element.

While the invention has been shown in only one embodiment, it will be obvious to those skilled in the art that it is not so limited, but is susceptible of various changes and modifications without departing from the spirit of the invention. It is desired, therefore, that only such limitations shall be placed thereupon as are specifically set forth in the appended claims.

What is claimed as new and desired to be secured by Letters Patent of the United States is:

1. An electric heating vessel comprising an aluminum open topped container, a sheathed heating element positioned on the bottom of said container, the sheath of said element being made of aluminum and having a lengthwise extending bore and a laterally extending horizontal flange portion, said flange being welded to the bottom of said container.

2. An electric heating vessel comprising an aluminum container; a sheathed heating element having a sheath, a coil of resistance wire, and a body of compacted insulating material supporting said coil in spaced relation to said sheath, said sheath being made of aluminum and having a lengthwise extending bore; and said sheath having a laterally extending horizontally positioned flange portion, said flange being welded to the bottom of said container.

3. An electric heating vessel comprising an aluminum container, a sheathed heating element positioned on the bottom of said container, the sheath of said element being made of aluminum and formed by swaging a circular sectional shaped bore to a generally elliptical shaped bore to produce a high degree of compacting of the insulating material of the sheathed element, and said sheath being formed with a laterally extending horizontal flange portion, said flange being welded to the bottom of said container.

4. An electric heating vessel comprising an aluminum container, a sheathed heating element having an aluminum sheath, said sheath having a pair of outwardly extending flanges, said flanges being secured to said container by welding, and the outer surface of said flanges intersecting said container at an obtuse angle to prevent blow out of an electric welding arc.

5. The method of constructing an electrically heated vessel comprising the steps of forming an aluminum sheath element having a circular bore and flange portions extending laterally of said sheath, mounting a conducting coil in spaced relation to the inside of said sheath, inserting heat conducting electrically insulating powder between said coil and said sheath, deforming said sheath to compact said powder, forming the sheathed element to a generally circular shape, and welding said flange portions to an aluminum cooking vessel.

6. The method of constructing an electrically heated vessel comprising the steps of extruding an aluminum sheath element having an axially extending bore and flange portions extending in the same plane from opposite sides of said element, mounting a conducting coil in spaced relation to the inside walls of said sheath, compacting heat conducting electrical insulating powder between said coil and said sheath, swaging said sheath to further compact said powder, forming the sheathed element to an annular shape, and welding said flange portions to an aluminum cooking vessel.

7. The method of constructing an electrically heated vessel comprising the steps of extruding an aluminum sheath element having an axially extending bore and flange portions extending tangentially in the same plane from opposite sides of said element, mounting a conducting coil in said bore in spaced relation to the inside walls of said sheath, compacting heat conducting electrical insulating powder between said coil and said sheath, swaging said sheath to further compact said powder, forming the sheathed element to an annular shape, flattening the circularly formed sheathed element so that said flange portions will conform to a portion of the surface of an aluminum cooking vessel, and welding said flange portions to said aluminum cooking vessel.

8. The method of constructing an electrically heated vessel comprising the steps of extruding an aluminum sheath element having a lengthwise extending bore and flange portions extending in the same plane from opposite sides of said element, mounting a conducting coil in spaced relation to the inside of said sheath, compacting heat conducting electrical insulating powder between said coil and said sheath, swaging said sheath to further compact said powder, forming the sheathed element to an annular shape, swaging said sheath a second time to compact said powder loosened by said forming, and welding said flange portions to an aluminum cooking vessel.

9. An electric heating vessel comprising an aluminum vessel, an aluminum sheathed heating element welded to the bottom of said vessel, said sheath having an annular shape with a flat upper surface in good heat transfer relation with said vessel.

10. An electric heating vessel comprising an aluminum vessel, an aluminum sheathed heating element welded to the bottom of said vessel, said sheath having an annular shape with a flat upper surface in good heat exchange relation to the bottom of said vessel, said upper surface having an inner and an outer edge where the surface of said sheath extends away from the bottom of said vessel, said sheath being welded to said vessel continuously along said inner and outer edges.

References Cited in the file of this patent

UNITED STATES PATENTS

| | | |
|---|---|---|
| 1,359,400 | Lightfoot | Nov. 16, 1920 |
| 1,731,119 | Abbott | Oct. 8, 1929 |
| 1,788,817 | Wilson et al. | Jan. 13, 1931 |
| 2,428,899 | Wiegand | Oct. 14, 1947 |
| 2,462,016 | Wiegand | Feb. 15, 1949 |
| 2,504,868 | Muller et al. | Apr. 18, 1950 |
| 2,703,358 | Mertler | Mar. 1, 1955 |
| 2,749,426 | Schwaneke | June 5, 1956 |
| 2,786,125 | Drugmand et al. | Mar. 19, 1957 |